(12) United States Patent
Williams et al.

(10) Patent No.: US 12,541,948 B2
(45) Date of Patent: Feb. 3, 2026

(54) FRAME CLASSIFICATION TO GENERATE TARGET MEDIA CONTENT

(71) Applicant: Roku, Inc., San Jose, CA (US)

(72) Inventors: Bruce Patrick Robert Williams, Bristol (GB); Joseph William Bignell, Cardiff (GB); Russell Stuart Love, Cardiff (GB)

(73) Assignee: Roku, Inc., San Jose, CA (US)

( * ) Notice: Subject to any disclaimer, the term of this patent is extended or adjusted under 35 U.S.C. 154(b) by 272 days.

(21) Appl. No.: 18/485,891

(22) Filed: Oct. 12, 2023

(65) Prior Publication Data
US 2025/0124689 A1    Apr. 17, 2025

(51) Int. Cl.
*G06V 10/764* (2022.01)
*G10L 15/26* (2006.01)

(52) U.S. Cl.
CPC ............ *G06V 10/764* (2022.01); *G10L 15/26* (2013.01)

(58) Field of Classification Search
CPC .. G06V 10/764; G10L 15/26; H04N 21/8456; H04N 21/233; H04N 21/23418; H04N 21/26603; H04N 21/8106; H04N 21/8549
USPC ........................................................ 382/224
See application file for complete search history.

(56) References Cited

U.S. PATENT DOCUMENTS

| | | | |
|---|---|---|---|
| 6,535,639 B1 * | 3/2003 | Uchihachi | G06F 16/7847 382/209 |
| 11,120,293 B1 * | 9/2021 | Rosenzweig | G06T 7/215 |
| 2006/0165379 A1 * | 7/2006 | Agnihotri | G06F 16/735 348/E7.071 |
| 2014/0344702 A1 * | 11/2014 | Edge | G06Q 10/10 715/730 |
| 2016/0014482 A1 * | 1/2016 | Chen | H04N 21/8456 386/241 |
| 2018/0061459 A1 * | 3/2018 | Song | G06V 10/993 |
| 2019/0251360 A1 * | 8/2019 | Cricri | G06V 10/82 |
| 2019/0377955 A1 | 12/2019 | Swaminathan et al. | |
| 2020/0334468 A1 | 10/2020 | Agarwal et al. | |
| 2021/0224571 A1 * | 7/2021 | Vartakavi | G06F 18/214 |
| 2023/0306539 A1 * | 9/2023 | Frei | G06V 10/454 |

OTHER PUBLICATIONS

Extended European Search Report in corresponding European application No. 24205555.6 mailed Mar. 3, 2025 in 12 pages.
Mayu Otani, et al: "Video Summarization Overview", Arxiv.org, Cornell University Library, 202 Olin Library Cornell University Ithaca, NY 14853, Oct. 21, 2022 (Oct. 21, 2022), XP091350362, DOI: 10.1561/0600000099 in 55 pages.

* cited by examiner

*Primary Examiner* — Allen H Nguyen
(74) *Attorney, Agent, or Firm* — Straylight LLP

(57) ABSTRACT

Aspects of the disclosed technology provide solutions for processing media content to generate customized media content of a target duration. An example method can include receiving media content of a first duration. The media content may include a plurality of video frames. The method can include steps for receiving one or more parameters, which may include a target duration, classifying each of the plurality of video frames of the media content based on a relevance level of each frame, and generating a target media content of the target duration based on the classification of the plurality of video frames of the media content of the first duration. Systems and machine-readable media are also provided.

18 Claims, 10 Drawing Sheets

700

IDENTIFY MULTIPLE FRAMES OF A MEDIA CONTENT
710

ANALYZE EACH VIDEO FRAME
720

ASSIGN A RELEVANCE SCORE BASED ON THE ANALYSIS OF EACH FRAME
730

RANK THE MULTIPLE VIDEO FRAMES BY THE RELEVANCE SCORE
740

FRAME CLASSIFICATION TO GENERATE TARGET MEDIA CONTENT

BACKGROUND

Field

This disclosure is generally directed to processing media content, and more particularly to classifying frames of media content to generate customized media content with a target duration.

SUMMARY

Provided herein are system, apparatus, article of manufacture, method and/or computer program product embodiments, and/or combinations and sub-combinations thereof, for processing media content to classify frames of the media content and generate customized media content with a target duration and/or a recreated voiceover.

In some aspects, a method is provided for processing media content to classify frames of the media content to generate customized media content with a target duration and a desired voiceover based on the classification of frames. The method can operate in a content server(s) used to provide video content to remote devices or in a media device that is communicatively coupled to, for example, a display device. The method can operate in other devices such as, for example and without limitation, a smart television, a set-top box, a heads-up display (HMD), a mobile device, a desktop computer, or a laptop computer, among others.

The method can include receiving media content of a first duration. The media content can include a plurality of video frames. The method can include receiving one or more parameters that may include a target duration. Each of the plurality of video frames of the media content can be classified based on a relevance level of each frame. Based on the classification of the plurality of video frames of the media content of the first duration, a target media content with a target duration can be generated.

In some aspects, a system is provided for processing media content to classify frames of the media content and generate customized media content with a target duration. The system can include one or more memories and at least one processor coupled to at least one of the one or more memories and configured to receive media content of a first duration and receive one or more parameters that include a target duration. The media content can include a plurality of video frames. The at least one processor of the system can be configured to classify each of the plurality of video frames of the media content based on a relevance level of each frame. The at least one processor of the system can also be configured to generate a target media content of the target duration based on the classification of the plurality of video frames of the media content of the first duration.

In some aspects, a non-transitory computer-readable medium is provided for processing media content to classify frames of the media content and generate customized media content with a target duration. The non-transitory computer-readable medium can have instructions stored thereon that, when executed by at least one computing device, cause the at least one computing device to receiving media content of a first duration and receive one or more parameters that include a target duration. The media content can include a plurality of video frames. The instructions of the non-transitory computer-readable medium can, when executed by the at least one computing device, cause the at least one computing device to classify each of the plurality of video frames of the media content based on a relevance level of each frame. The instructions of the non-transitory computer-readable medium also can, when executed by the at least one computing device, cause the at least one computing device to generate a target media content of the target duration based on the classification of the plurality of video frames of the media content of the first duration.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
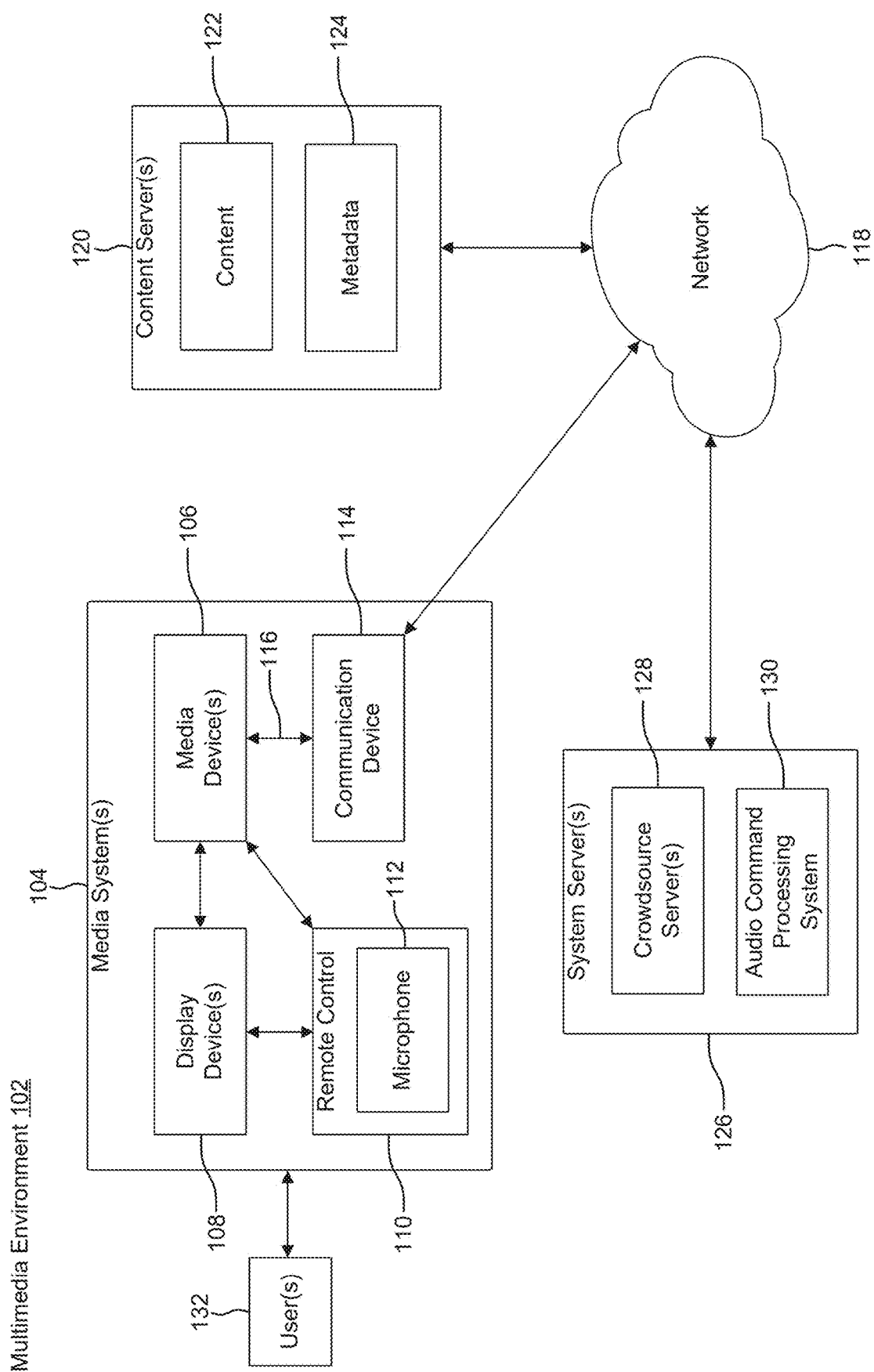
FIG. 1 illustrates a block diagram of an example multimedia environment, according to some examples of the present disclosure.

Users access and consume media content such as videos, at any time of day or any location, using a wide variety of client devices such as, for example, and without limitation, smart phones, desktop computers, laptop computers tablet computers, televisions (TVs), among others. The media content can include advertisements that depict, describe, announce, promote, identify, and/or relate to a product(s), a service(s), a brand(s), an event(s), a message(s), and/or any other item. Such media content may be accessible on various platforms across diverse channels by a wide range of viewers. As follows, a video commercial can be a versatile tool for businesses and marketers to connect with their target audience, build brand awareness, and so on.

However, converting or editing media content to adapt to various purposes (e.g., to have a shorter or longer duration/runtime, to target different audiences, etc.) can present several challenges. Specifically, adjusting the duration/runtime of a video commercial, while maintaining the video's message and effectiveness, may require careful decision-making in selecting frames to include in a reconstructed video with a desired runtime.

Aspects of the disclosed technology provide solutions for processing media content to generate customized media content of a target duration, for example, based on classification of frames of the media content. In some examples, a system such as a content server(s) or a client device can identify and classify frames of media content based on a relevancy of each frame. Based on the classification of the frames, a target media content having a target duration can be generated. In some examples, the classification of each frame can include classifying each of the frames into one of a high relevance group or a low relevance group. The high relevance group can include frames with a high relevance level and the low relevance group can include frames with a low relevance level. The system such as a content server(s) and/or client device can generate reconstructed media content that includes the frames of the high relevance group and meets the target duration (e.g., a desired runtime). In some implementations, machine learning techniques can be used to classify frames of the original media content based on an associated relevance or priority. Furthermore, in some aspects the system can use generative artificial intelligence (AI), for example, to generate new content that may enhance the impact or reach of the advertisement, while still adhering to the target duration of the reconstructed media content. By way of example, newly generated content may include, but is not limited to, newly created or modified voiceover narratives, audio content (e.g., music or sound effects) captions, and/or newly generated video content.

As discussed in further detail below, the technologies and techniques described herein can significantly reduce the time and effort expended by human editors by providing solutions for automatically converting media content (e.g., a video commercial) into reconstructed media content having an adjusted runtime (e.g., a shortened duration). Given original media content of a specific duration, the original media content can be processed to create a target media content having a desired runtime and/or in a different desired language while maintaining the key information of the original media content. For example, a video advertisement that has a 30-second runtime can be converted into a set of creatives that have a desired runtime of 5 seconds, 10 seconds, 15 seconds, or any duration that is desired.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some examples, content server(s) 120 or the media device(s) 106 can process content 122 to generate a target media content having a target duration (e.g., a desired runtime), which can be presented at the display device 108. For example, the content server 120 or the media device 106 can classify each frame of content 122 based on a relevance level relating to the target media content. The relevance level can be based on whether the frame includes or displays text. For example, the content server 120 or the media device 106 can classify a frame that includes a text on the frame as a keyframe (or a critical frame). If the frame does not include or display any text, the content server 120 or the media device 106 can classify the frame as an uncritical frame. In some aspects, the relevance level can be further based on contextual information associated with a frame or content 122, viewer information such as viewer or target audience profile data, a location of a frame within content 122, and/or a combination thereof. In some examples, content server(s) 120 or the media device(s) 106 can use an algorithm, such as a machine learning algorithm, to classify each frame of content 122.

In some cases, content server(s) 120 or the media device(s) 106 can generate a target media content based on the classification of frames of content 122. For example, content server(s) 120 or the media device(s) 106 can select one or more frames that are classified as keyframes (or critical frames) to include in the target media content. The number of frames that are selected for the target media content may correspond to a target duration of the target media content.

The content server(s) 120 or the media device(s) 106 can regenerate audio signals corresponding to the target duration of the target media content. For example, content server(s) 120 or the media device(s) 106 may use a generative machine learning model (e.g., generative adversarial network (GAN) to create voiceover that matches the target duration of the target media content.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
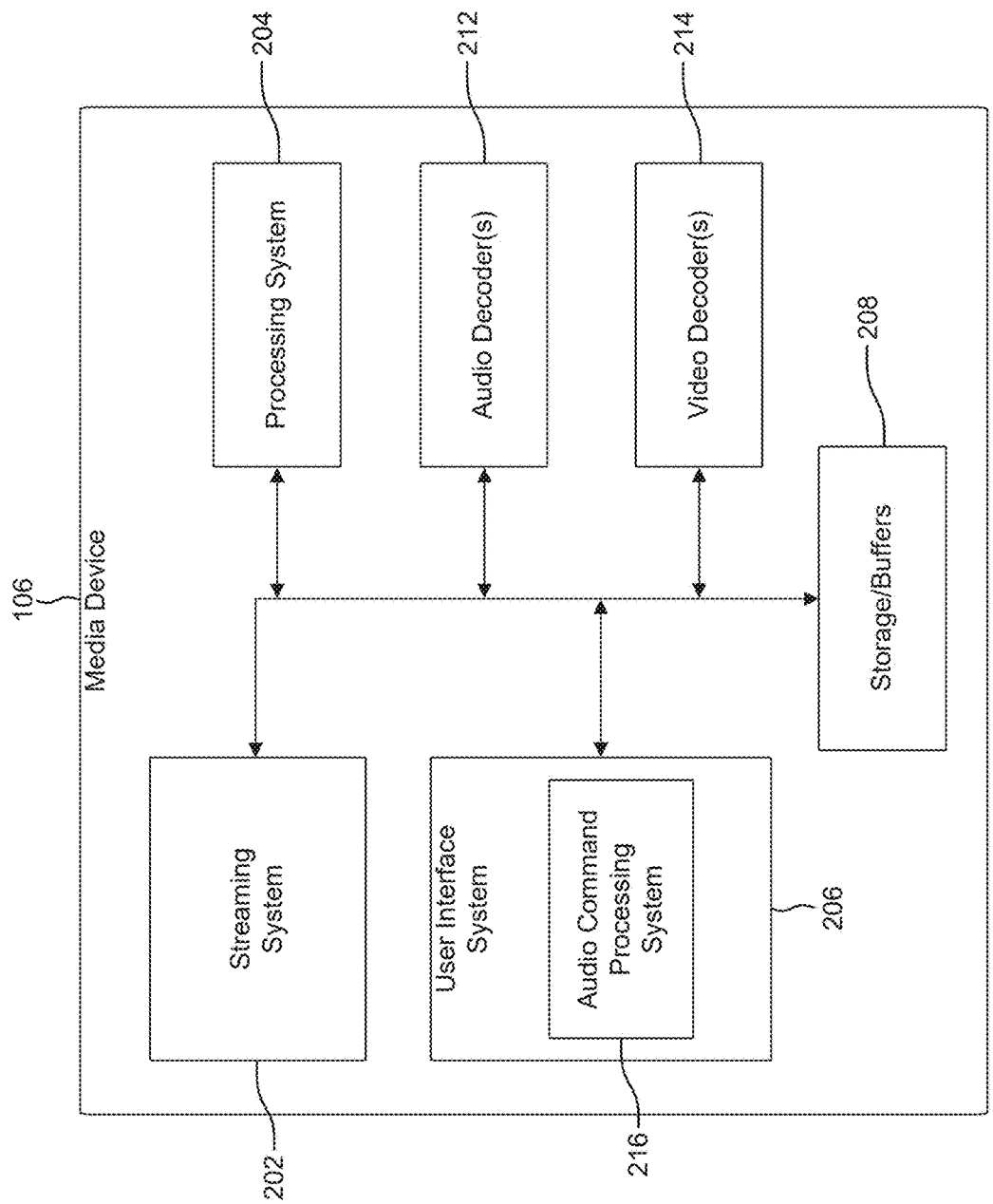
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Media Content Reconstruction Based on Frame Classification

Referring to FIG. 1, content server(s) 120 and/or the media system 104 can be configured to perform applicable functions related to classifying frames of media content and generating reconstructed media content with a target duration based on the frame classification. For example, content server(s) 120 and/or the media system 104 can evaluate and/or analyze each frame of a media content (e.g., a video) and determine whether the frame contains key information and/or is relevant to a target media content. That is, content server(s) 120 and/or the media system 104 can determine a relevance level based on various factors such as text displayed on a frame or a lack thereof, frame content, a location of a frame with the media content, contextual information associated with a frame or the media content, viewer or target audience information, and/or a combination thereof. Based on the relevance level of a frame, content server(s) 120 and/or the media system 104 can classify the frame as one of a high-relevance frame (e.g., a keyframe, a critical frame, etc.) or a low-relevance frame (e.g., an uncritical frame, etc.).

In some examples, content server(s) 120 and/or media devices 106 can receive one or more parameters that are pertinent to a target media content such as a desired runtime. The content server(s) 120 and/or the media system 104 can select one or more frames, among keyframes (e.g., frames that are classified as containing key information) to generate a target media content having the desired runtime. For example, content server(s) 120 and/or the media system 104 can choose a number of keyframes that match the desired runtime of the target media content.

Further, content server(s) 120 and/or the media system 104 can regenerate audio signals that corresponds to the target media content having the desired runtime. For example, content server(s) 120 and/or the media system 104 can generate voiceover, using a generative machine learning technique, that matches the desired runtime of the target media content. In some cases, content server(s) 120 and/or the media system 104 can generate a voiceover for the target media content in a new language that is different from an original language associated with pre-reconstructed media content.

The disclosure now continues with a further discussion of processing media content (e.g., classifying each frame of media content) and selecting one or more frames of media content to include in a target media content that has a specific target runtime.

Figure 3:
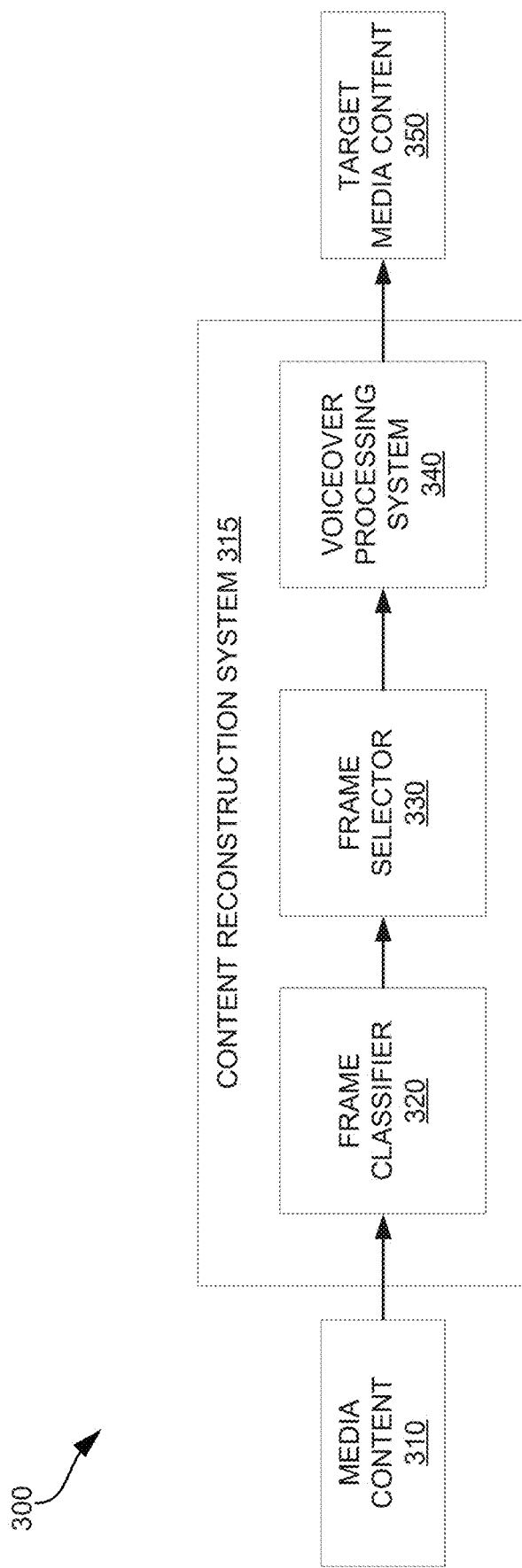
FIG. 3 illustrates an example system for processing media content to generate target media content, according to some examples of the present disclosure.

FIG. 3 is a system 300 for processing media content 310 to generate target media content 350 that has a target duration. The system 300 includes media content 310, content reconstruction system 315 (e.g., frame classifier 320, frame selector 330, voiceover processing system 340), and target media content 350. The various components of the system 300 can be implemented at applicable places in the multimedia environment 102 shown in FIG. 1. For example, media content 310 can reside at the content servers 120 or the media system 104 as part of reproducing media content 310 into target media content 350 for the user 132. Further, the content reconstruction system 315 including frame classifier 320, frame selector 330, and voiceover processing system 340 can reside at the media systems 104, the system servers 126, the content servers 120, cloud computing resources that may be associated with a network such as network 118, or a combination thereof.

In some examples, media content 310 can correspond to content 122 illustrated in FIG. 1 and can include music, videos, multimedia, images, text, graphics, and/or any other content or data objects in electronic form, which can be presented or displayed at a device such as media device(s) 106 illustrated in FIG. 1. For example, media content 310 can include a plurality of video frames, for example, a continuous sequence of video frames for a specific amount of time that defines a duration (e.g., runtime) of the media content 310. In some aspects, the plurality of video frames is associated with advertisements that may depict, describe, announce, promote, identify, and/or be related to a product(s), a service(s), a brand(s), an event(s), a message(s), and/or any other item. For example, the media content can be a commercial advertisement for a film, a show, etc. such as a trailer or a preview.

In some configurations, the content reconstruction system 315 can receive and process media content 310 to classify each frame of a plurality of frames of media content 310 and select one or more frames for target media content 350 based on the classification. For example, one or more frames can be selected to correspond to a target duration (e.g., a desired runtime) of target media content 350 based on the frame classification.

As shown, content reconstruction system 315 may include frame classifier 320, frame selector 330, and voiceover processing system 340. The frame classifier 320 is configured to identify a plurality of frames of media content 310 and classify each frame of the plurality of frames based on a relevance level relating to target media content 350. The classification can be binary classification where each frame is assigned to one group from two exclusive groups (e.g., a high-relevance group or a low-relevance group), or multi-class classification.

In some aspects, a relevance level of a frame can be determined based on text displayed on the frame or a lack thereof. For example, if a frame includes or displays text, the frame classifier 320 may classify the frame as a keyframe (or a critical frame). If a frame does not display any text, the frame classifier 320 may classify the frame as an uncritical frame. As follows, a high-relevance group can include one or more keyframes that display text and a low-relevance group may include one or more uncritical frames that do not display text.

In some cases, a relevance level of a frame relating to target media content 350 can be further based on various factors such as a context associated with the frame, a location of the frame within the media content 310, a viewer or target audience of the target media content 350 (e.g., demographics of viewer or target audience such as age, sex, location, income, etc., viewer preferences, viewing history, etc.), and so on. For example, if a frame is located at the beginning of media content 310, it is highly likely that the frame contains key information. If a frame is located at the end of media content 310, it is likely that the frame does not contain key information.

In some aspects, contextual information associated with a frame or media content can be used to determine a relevance level of a frame. Non-limiting examples of contextual information can include a type and/or genre of content, a type of product, service, a brand that media content is promoting, a type of scene, a background and/or setting, any activity and/or events, an actor(s), a mood and/or sentiment, a type of audio (e.g., dialogue, music, noise, certain sounds, etc.) or lack thereof, any objects (e.g., a product and/or brand, a device, a structure, a tool, a toy, a vehicle, etc.), environment/place/location of the scene, a landmark and/or architecture, a geographic region or location, a keyword, a message, a time and/or date, any other characteristics associated with media content 310, and/or any combination thereof.

Also, viewer or target audience information can be used to determine a relevance level of a frame. Non-limiting examples of viewer or target audience information can include any information associated with audience and/or target audience such as demographics (e.g., age, sex, a geographic region or location, income, generation, occupation, etc.), user preferences (e.g., likes and/or dislikes), privacy settings, viewing history, search history, social media data, etc.

In some approaches, a relevance level associated with a frame can include a relevance score that is computed based on various parameters as described above. For example, each parameter can include weights or biases based on the importance of the parameter in relation to a frame, media content, and/or a target media content. As follows, content reconstruction system 315 may weight each parameter in calculating the overall relevance score so that the parameters contribute differently to the overall relevance score. Relevance scores can be used to provide more granular indications of frame relevance or importance, as compared to binary classification approaches that specify either a keyframe or non-keyframe status.

As previously described, the frame classifier 320 can classify each frame into one of a high-relevance group or a low-relevance group. A high-relevance group may include one or more frames from media content 310 that contain key information that the media content 310 aims to convey (e.g., keyframes or critical frames that contain text). By way of example, keyframes may include those that include product identifying information, such as the names of a product, service, business or brand. In some aspects, keyframes may include information necessary for purchasing a product or service, such as an address, telephone number or product website where products/services may be purchased or where brand representatives may be reached. Keyframes may also include other types of information that may provide compelling reasons for a potential customer to purchase the advertised product or service. By way of example, keyframes may include information relating to customer testimonials, product reviews, and/or product comparison information, etc. In contrast, frames classified into the low-relevance group may include one or more frames from media content 310 that do not contain key information and/or that are provided merely for visual context. By way of example, the low-relevance group may consist of frames that do not contain text, and/or that contain information that has already been presented by earlier keyframes.

In some cases, the frame classifier 320 can assign each frame with a relevance score based on the relevance level relating to target media content 310. For example, frame classifier 320 may assign a high relevance score with a frame that contains key information. The frame classifier 320 may assign a low relevance score with a frame that does not contain key information. As follows, the frames from media content 310 can be ranked based on the relevance score, which can be used in selecting frames to be included in target media content 350.

In some aspects, the frame classifier 320 can use an applicable technique for classifying frames of media content 310. For example, the frame classifier 320 can use an applicable machine learning-based technique for classifying frames of media content 310. Non-limiting examples of machine learning models for classification can include a regression model (e.g., a linear model for binary classification), neural networks (e.g., deep learning models), decision trees, etc. For example, a machine learning model implemented at frame classifier 320 can use respective signals within a frame (e.g., text signals) to classify the frame as a critical frame (e.g., a high-relevance frame) or an uncritical frame (e.g., a low-relevance frame).

In some cases, the frame selector 330 can select one or more frames to include in target media content 350 based on the frame classification. For example, the frame selector 330 can select a number of frames that are in a high-relevance group (e.g., keyframes, critical frames, frames that have a high relevance relating to target media content 350) to construct target media content 350. The number of frames selected for target media content 350 corresponds to a target duration (e.g., a desired runtime of target media content 350). For example, if a desired runtime of target media content 350 is 5 seconds, the frame selector 330 may choose frames to can be viewed for 5 seconds in duration.

If there are redundant frames that cannot fit into target media content 350 due to a short duration of the target media content 350, the frame selector 330 may select frames based on the relevance score. For example, the frame selector 330 may rank frames based on the relevance score and select the high-ranked frames (e.g., frames with high relevance scores) in a number that corresponds to a desired runtime. If there is a lack of keyframes to match the desired runtime, the frame selector 330 may select frames from initially unselected frames that may have a high relevance level or a high relevance score so that enough number of frames can be selected to correspond to the desired runtime.

The voiceover processing system 340 functions to regenerate audio signals corresponding to a target duration of target media content 350. For example, if a duration of media content 310 is shortened for target media content 350, voiceover processing system 340 can regenerate audio signals based on the selected frames that are included in target media content 350 to match the new duration of target media content 350.

In some examples, the voiceover processing system 340 can use an applicable technique for regenerating audio signals for target media content 350 having a target duration. For example, the voiceover processing system 340 can use an applicable artificial intelligence (AI) based technique (e.g., artificial neural network, generative AI) configured to process and/or generate transcript from media content 310. In some examples, if an original voiceover for media content 310 does not fit a target duration (e.g., a desired runtime) of target media content 350, a generative model (e.g., re-generative AI) can create a new voiceover script based on the original transcript and the target duration. As follows, a test-to-speech model can be used to generate audio for the new script for target media content 350 in a desired language(s). In some cases, in regenerating audio signals for target media content 350, voiceover processing system 340 may determine, based on the transcript generated from media content 310, whether a text displayed on a frame is provided as corresponding audio signals or not.

In some examples, the voiceover processing system 340 can be configured to learn and/or understand semantics in the transcript/text or ontology information associated with the transcript/text such that voiceover processing system 340 is learned to generate a new voiceover for target media content 350 having a target duration that may not be long enough to include audio or narrative corresponding to a text displayed on a frame. For example, voiceover processing system 340 may determine that a voiceover for a text displayed on a frame needs to be shortened for the reduced runtime and reword or paraphrase the transcript, while maintaining the key information of the text, to meet the given target duration of target media content 350 (e.g., to deliver the message displayed as text on the frame within the given target duration).

In some approaches, the voiceover processing system 340 may generate a new version of target media content 350, for example, in a new language that is different from an original language associated with media content 310. For example, the voiceover processing system 340 may generate a voiceover narrative for target media content 350 in a new language to target different audience or platforms.

Figure 4:
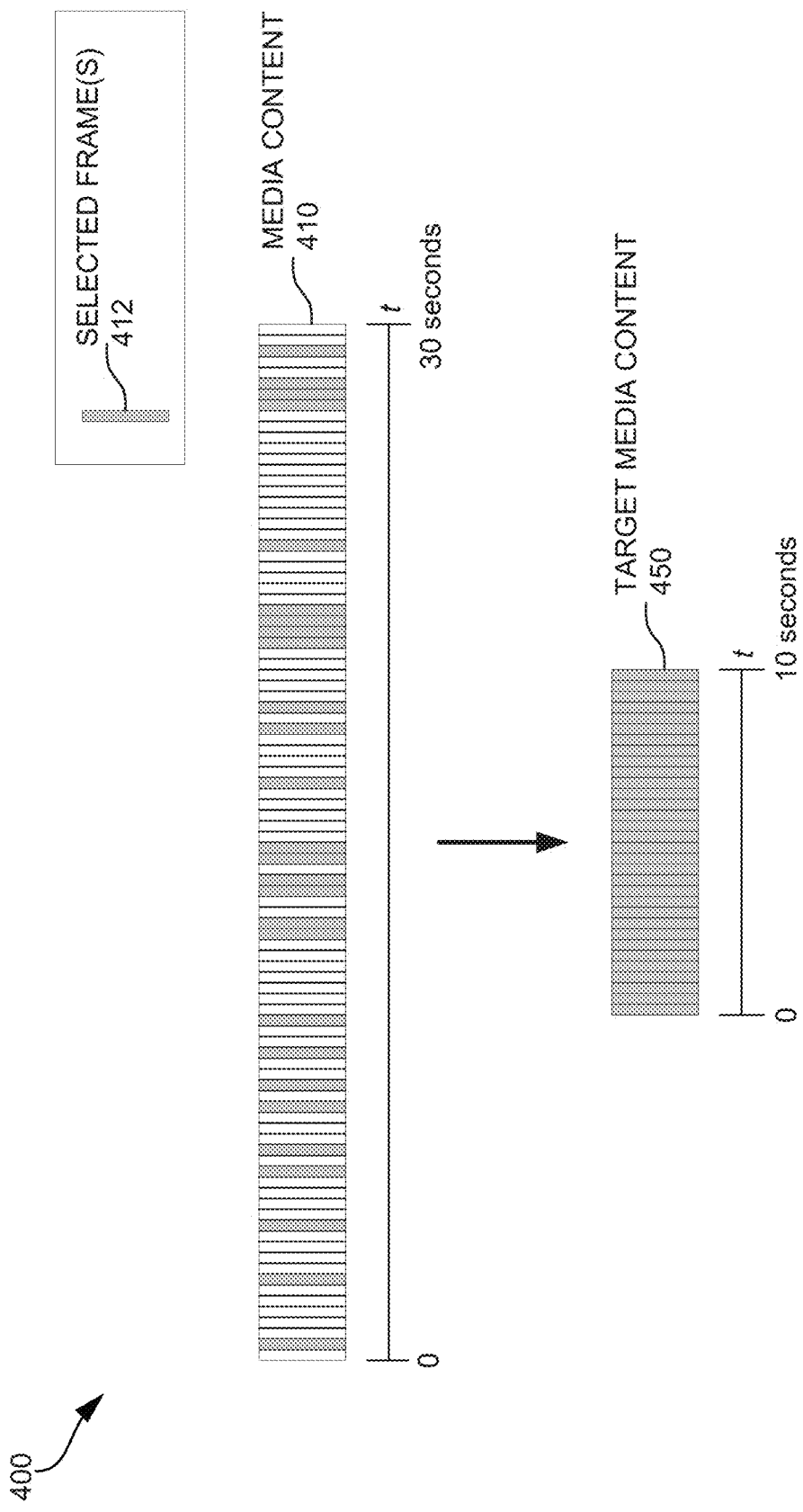
FIG. 4 is a conceptual diagram of target media content that has been generated based on selected frames of media content, according to some examples of the present disclosure.

FIG. 4 is a diagram 400 illustrating an example target media content 450 generated based on selected frames 412 of media content 410, according to some examples of the present disclosure. As shown in FIG. 4, media content 410 that has a runtime of 30 seconds can be reconstructed into target media content 450 that has a runtime of 10 seconds. The reconstruction of media content 410 can include classifying each frame of media content 410, selecting one or more frames (e.g., selected frames 412) to create target media content 450 that has a desired runtime (e.g., 10 seconds), and regenerating audio signals corresponding to the desired runtime of target media content 450.

For instance, content reconstruction system 315 illustrated in FIG. 3 can classify each frame of media content 410 based on a relevance level to generate target media content 450 that consists of selected frames 412. Specifically, content reconstruction system 315 may select keyframes (e.g., selected frames 412) and generate target media content 450 that consists of selected frames 412.

If selected frames 412 are more than what is needed for 10 seconds of the desired runtime (e.g., target media content 450 consisted of selected frames 412 would have a runtime of 5 seconds that is short of the desired runtime), content reconstruction system 315 may determine that a few selected frames 412 need to be discarded and not included in target media content 450. The content reconstruction system 315 may compare a relevance level or a relevance score of the selected frames 412 and select the frames that have a high relevance level or a high relevance score.

If selected frames 412 are less than what is needed for 10 seconds of the desired runtime (e.g., target media content 450 consisted of selected frames 412 would have a runtime of 15 seconds that exceeds the desired runtime), content reconstruction system 315 may compare a relevance level or a relevance score of unselected frames of media content 410 and select the frames that have a high relevance level or a high relevance score.

Figure 5:
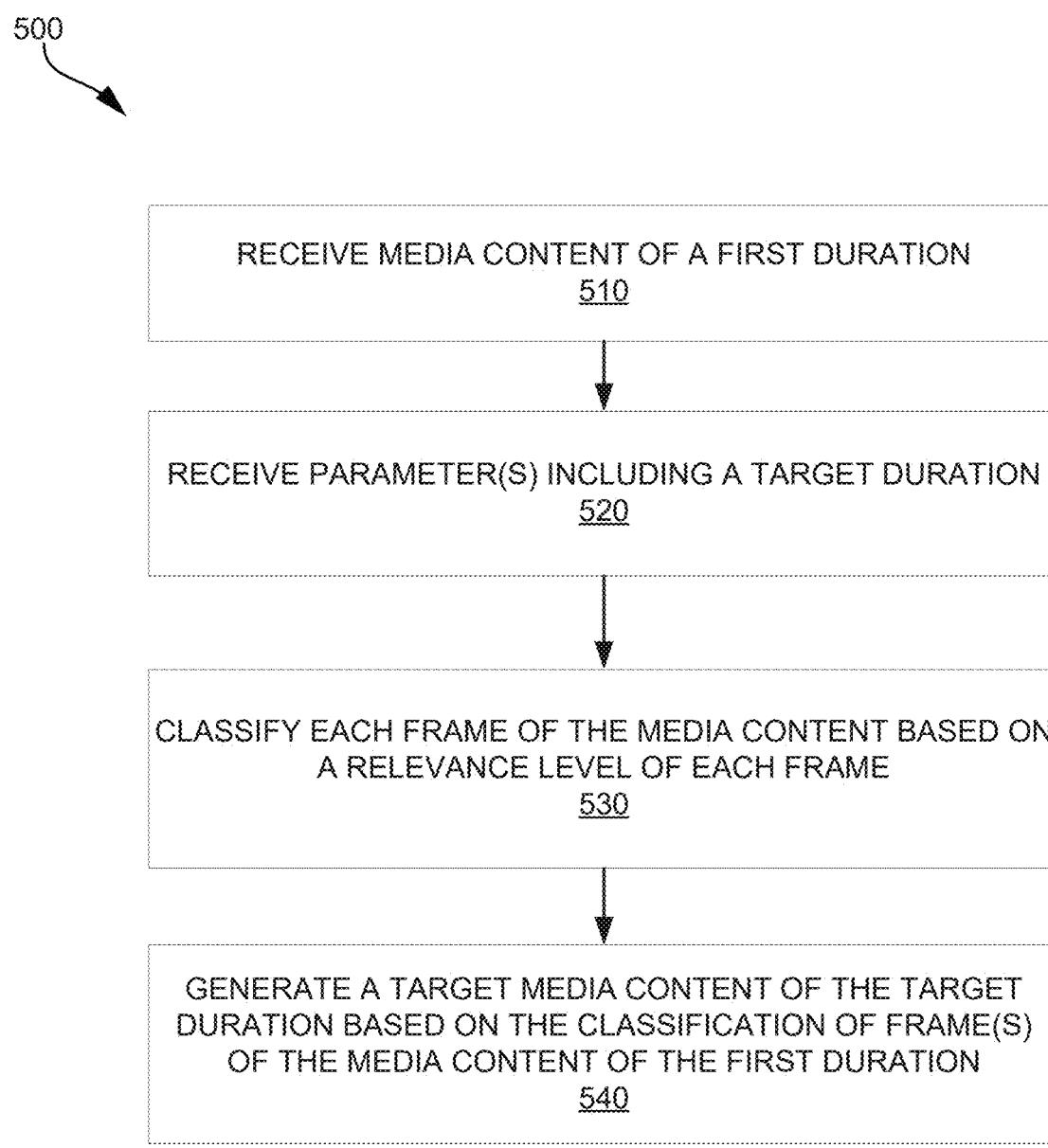
FIG. 5 illustrates a flowchart of an example method for generating target media content of a target duration based on the classification of frames of media content, according to some examples of the present disclosure.

FIG. 5 is a diagram illustrating a flowchart of an example method 500 for generating a target media content of a target duration based on the classification of frames of media content, according to some examples of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example.

In step 510, method 500 includes receiving media content of a first duration. For example, content reconstruction system 315 can receive media content (e.g., content 122, media content 310, media content 410, etc.). In some aspects, content reconstruction system 315 may receive media content 310 from a content server (e.g., content server(s) 120) over a network (e.g., network 118). The media content may include a plurality of frames such as a continuous sequence of video frames.

In step 520, method 500 includes receiving parameter(s) including a target duration (e.g., a desired runtime). For example, content reconstruction system 315 may receive one or more parameters that are associated with a target media content from convent server(s) 120, system server(s) 126, or user 132. Non-limiting examples of parameters that are associated with a target media content (e.g., target media content 350) can include a target duration (e.g., a desired runtime of a target media content), target viewer/audience information (e.g., demographics of viewer/audience, etc.), a geographic region or location for streamlining the target media content, a type of a product, service, or brand that a target media content is identifying, depicting, or promoting, a provider of a target media content, and so on.

In some examples, a target duration can provide a desired runtime for a target media content (e.g., target media content 350) that is shorter than a duration of an original media content (e.g., media content 310) such that some frames of media content 310 need to be selected to be included in target media content 350 and other frames of media content 310 need to be discarded.

In step 530, method 500 includes classifying each frame of the media content based on a relevance level of each frame. Each frame of the plurality of frames of media content can be classified through the application of one or more machine learning models. For example, content reconstruction system 315 (e.g., frame classifier 320) can classify each frame as a high-relevance frame (e.g., a keyframe, a critical frame) or a low-relevance frame (e.g., an uncritical frame) based on a relevance level of each frame. The relevance level can be based on one or more factors such as presence or absence of text displayed on a frame, a location of a frame within a media content, one or more characteristics of a target media content, a provider of a media content or a target media content, a geographic location or region for streamlining a target media content, target viewer or audience demographics, etc.

In some aspects, a relevance level can include a relevance score that is assigned with each frame. For example, content reconstruction system 315 (e.g., frame classifier 320) may assign each frame with a relevance score based on the relevance level relating to target media content 310. For example, frame classifier 320 may assign a high relevance score with a frame that contains key information. The frame classifier 320 may assign a low relevance score with a frame that does not contain key information. As follows, the frames from media content 310 can be ranked based on the relevance score, which can be used in selecting frames to be included in target media content 350.

In step 540, method 500 includes generating a target media content of the target duration based on the classification of frame(s) of the media content of the first duration. For example, content reconstruction system 315 (e.g., frame selector 330) may select one or more frames to include in target media content 350 based on the frame classification. Specifically, the frame selector 330 can select the frames that are classified as high-relevance frames (e.g., keyframes, critical frames) for target media content 350. The number of frames to be selected can correspond to a target duration (e.g., a desired runtime of target media content 350). As follows, content reconstruction system 315 may generate target media content 350 that consists of high-relevance frames (e.g., selected frames 412 illustrated in FIG. 4).

In some examples, method 500 can include providing the target media content of the target duration to a device associated with a user or an audience. For example, content reconstruction system 315 can be implemented on a server (e.g., content server(s) 120 illustrated in FIG. 1) that is configured to provide target media content 350 to a media device (e.g., media device(s) 106).

Figure 6:
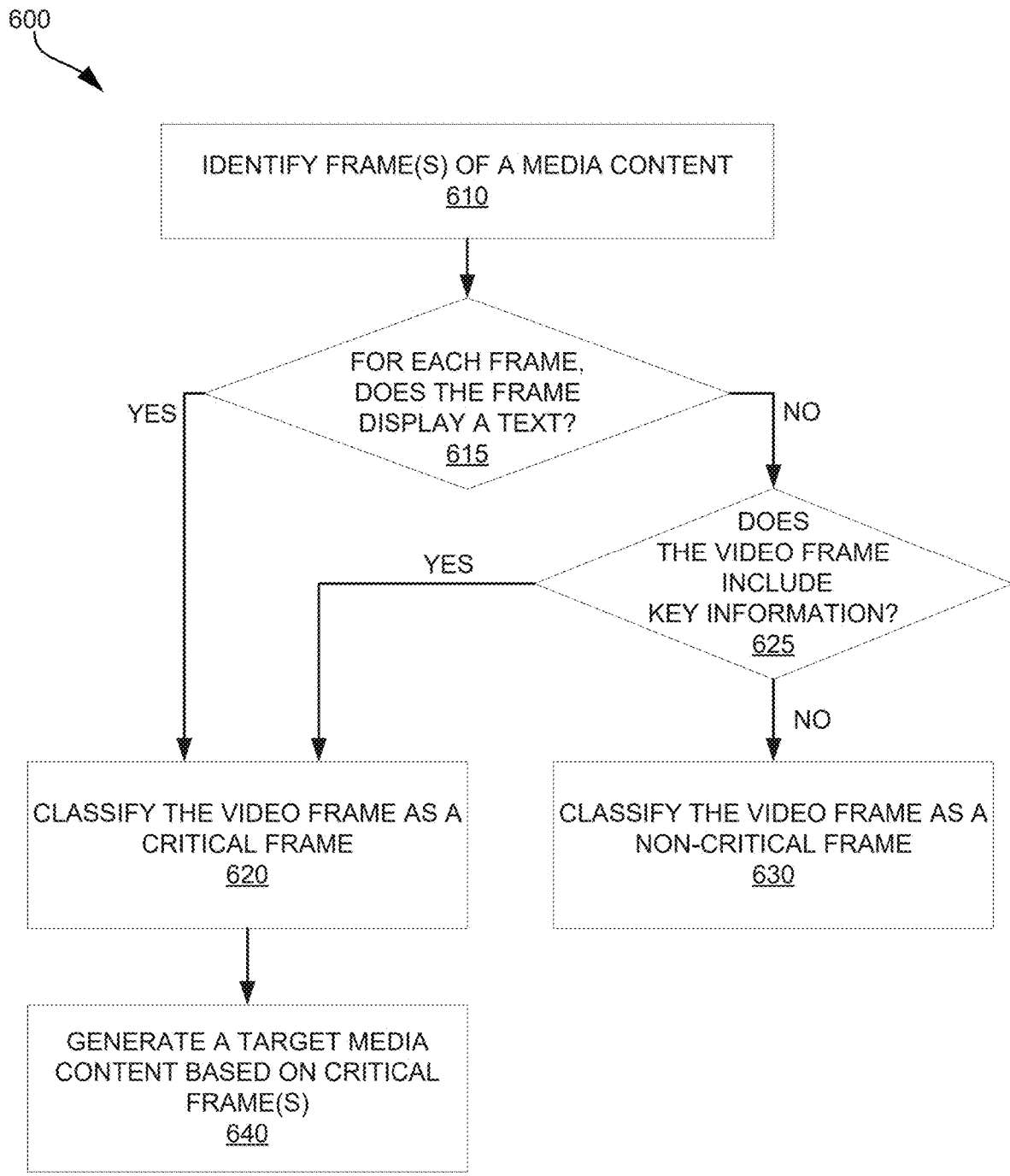
FIG. 6 illustrates a flowchart of an example method for classifying frame(s) of media content, according to some examples of the present disclosure.

FIG. 6 is a diagram illustrating a flowchart of an example method 600 for classifying frame(s) of media content (e.g., binary classification of frames), according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example.

Method 600 starts with step 610, which includes identifying frames of media content. For example, content reconstruction system 315 may receive media content 310 that comprises a plurality of video frames. The media content can include an advertisement that may depict, describe, announce, promote, identify, and/or be related to a product(s), a service(s), a brand(s), an event(s), a message(s), and/or any other item.

In step 615, method 600 includes determining, for each frame, whether the frame displays a text. For example, content reconstruction system 315 may determine whether the frame includes text that may be indicative of containing key information associated with the media content.

If the frame displays a text, method 600 proceeds to step 620, which includes classifying the frame as a critical frame (or a keyframe), which is a candidate of a frame for a target media content. For example, content reconstruction system 315 may determine that a frame that includes text may contain key information that needs to be preserved and added to a target media content. As follows, content reconstruction system 315 may classify a frame with text as a critical frame (or a keyframe).

Alternatively, if the frame does not display any text, method 600 proceeds to step 625, which includes determining whether the frame includes key information associated with the media content. For example, content reconstruction system 315 may evaluate various parameters associated with the frame to determine whether a frame without text may include any key information that needs to be saved for target media content 350. Non-limiting examples of parameters that can be considered may include contextual information associated with the frame such as a type and/or genre of content, a type of product, service, a brand that media content is promoting, a type of scene, a background and/or setting, any activity and/or events, an actor(s), a mood and/or sentiment, a type of audio (e.g., dialogue, music, noise, certain sounds, etc.) or lack thereof, any objects (e.g., a product and/or brand, a device, a structure, a tool, a toy, a vehicle, etc.), environment/place/location of the scene, a landmark and/or architecture, a geographic location, a keyword, a message, a time and/or date, any other characteristics associated with media content 310, and/or any combination thereof.

If the frame includes key information, method 600 proceeds to step 620, which includes classifying the frame as a critical frame, and thereafter, step 640, which includes generating a target media content based on critical frames. Alternatively, if the frame does not include key information, method 600 may proceed to step 630, which includes classifying the frame as a non-critical frame (e.g., an uncritical frame), which may not be included in target media content.

Figure 7:
FIG. 7 illustrates a flowchart of an example method for classifying frame(s) of media content with a relevance score, according to some examples of the present disclosure.
Figure 7:
Figure 7:

FIG. 7 is a diagram illustrating a flowchart of an example method 700 for classifying frame(s) of media content with a relevance score, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example.

In step 710, method 700 includes identifying multiple frames of media content. For example, content reconstruction system 315 may receive media content 310 that comprises a plurality of video frames. As previously described, the media content may include an advertisement that may depict, describe, announce, promote, identify, and/or be related to a product(s), a service(s), a brand(s), an event(s), a message(s), and/or any other item.

In step 720, method 700 includes analyzing each video frame of the media content. For example, content reconstruction system 315 may analyze each frame of media content 310 such as presence or absence of text displayed on a frame, context associated with the frame, a location of the frame within the media content 310, a viewer or target audience of the target media content 350 (e.g., demographics of viewer or target audience such as age, sex, location, income, etc., viewer preferences, viewing history, etc.), and so on.

In step 730, method 700 includes assigning a relevance score to each frame based on the analysis of each frame. For example, content reconstruction system 315 may determine a relevance score for each frame based on various parameters that are analyzed in step 720. In some cases, each parameter can include weights or biases based on the importance of the parameter in relation to a frame, media content, and/or a target media content. As follows, content reconstruction system 315 may weight each parameter in calculating the overall relevance score so that the parameters contribute differently to the overall relevance score.

In step 740, method 700 includes ranking the multiple video frames by the relevance score. For example, content reconstruction system 315 may rank frames of media content 310 based on the relevance score that is determined in step 730. As follows, content reconstruction system 315 may select one or more frames based on the relevance score and/or ranking such that the number of frames for a target media content corresponds to a target duration (e.g., a desired runtime).

Figure 8:
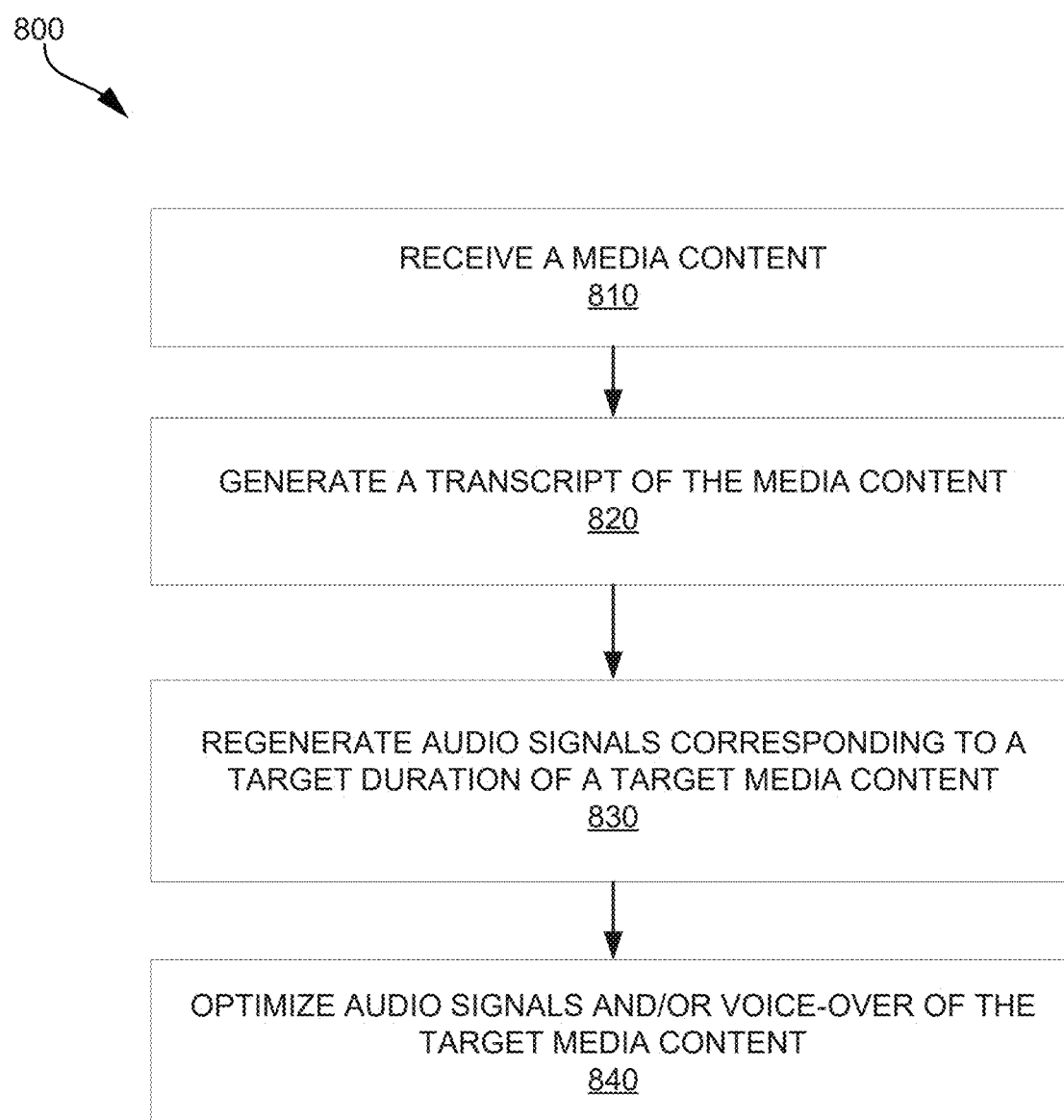
FIG. 8 illustrates a flowchart of an example method for regenerating audio signals for a target media content of a target duration, according to some examples of the present disclosure.

FIG. 8 is a diagram illustrating a flowchart of an example method 800 for regenerating audio signals for a target media content of a target duration, according to some examples of the present disclosure. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 3. However, method 800 is not limited to that example.

In step 810, method 800 includes receiving a media content. For example, content reconstruction system 315 can receive media content (e.g., content 122, media content 310, media content 410, etc.). In some aspects, content reconstruction system 315 may receive media content 310 from a content server (e.g., content server(s) 120) over a network (e.g., network 118). The media content may include a plurality of frames such as a continuous sequence of video frames.

In step 820, method 800 includes generating a transcript of the media content. For example, content reconstruction system 315 (e.g., voiceover processing system 340) may generate a transcript of media content 310.

In step 830, method 800 includes regenerating audio signals corresponding to a target duration of a target media content. For example, content reconstruction system 315 (e.g., voiceover processing system 340) may regenerate audio signals corresponding to a target duration of target media content 350. For example, if a duration of media content 310 is shortened for target media content 350, voiceover processing system 340 can regenerate audio signals based on the selected frames that are included in target media content 350 to match the new duration of target media content 350.

As previously described, content reconstruction system 315 (e.g., voiceover processing system 340) can use an applicable artificial intelligence (AI) based technique (e.g., artificial neural network) to regenerate audio signals for target media content 350. For example, if an original voiceover for media content 310 no longer fits a target duration (e.g., a desired runtime) of target media content 350, a generative model (e.g., re-generative AI) can create a new voiceover script based on the original transcript that is generated in step 820 and the target duration of target media content 350. Then, a test-to-speech model can be used to generate audio for the new script for target media content 350 in a desired language(s).

In step 840, method 800 includes optimizing audio signals and/or voice-over of the target media content. For example, content reconstruction system 315 (e.g., voiceover processing system 340) can be configured to learn and/or understand semantics in the transcript/text or ontology information associated with the transcript/text. That is, content reconstruction system 315 (e.g., voiceover processing system 340) can be learned to generate a new voiceover for target media content 350 having a shorter duration such that a narrative or dialogue corresponding to a text cannot be sufficiently fit within the target duration of target media content 350. In such case, the content reconstruction system 315 (e.g., voiceover processing system 340) can reword or paraphrase the transcript to deliver the message displayed as text on the frame, without disrupting the key information of the text, within the given target duration.

In some examples, content reconstruction system 315 (e.g., voiceover processing system 340) can generate a new set of target media content 350 in new languages that are different from an original language associated with media content 310. For example, content reconstruction system 315 (e.g., voiceover processing system 340) may generate a voiceover, using a generative machine learning model, for target media content 350 in a new language to target different audience.

Figure 9:
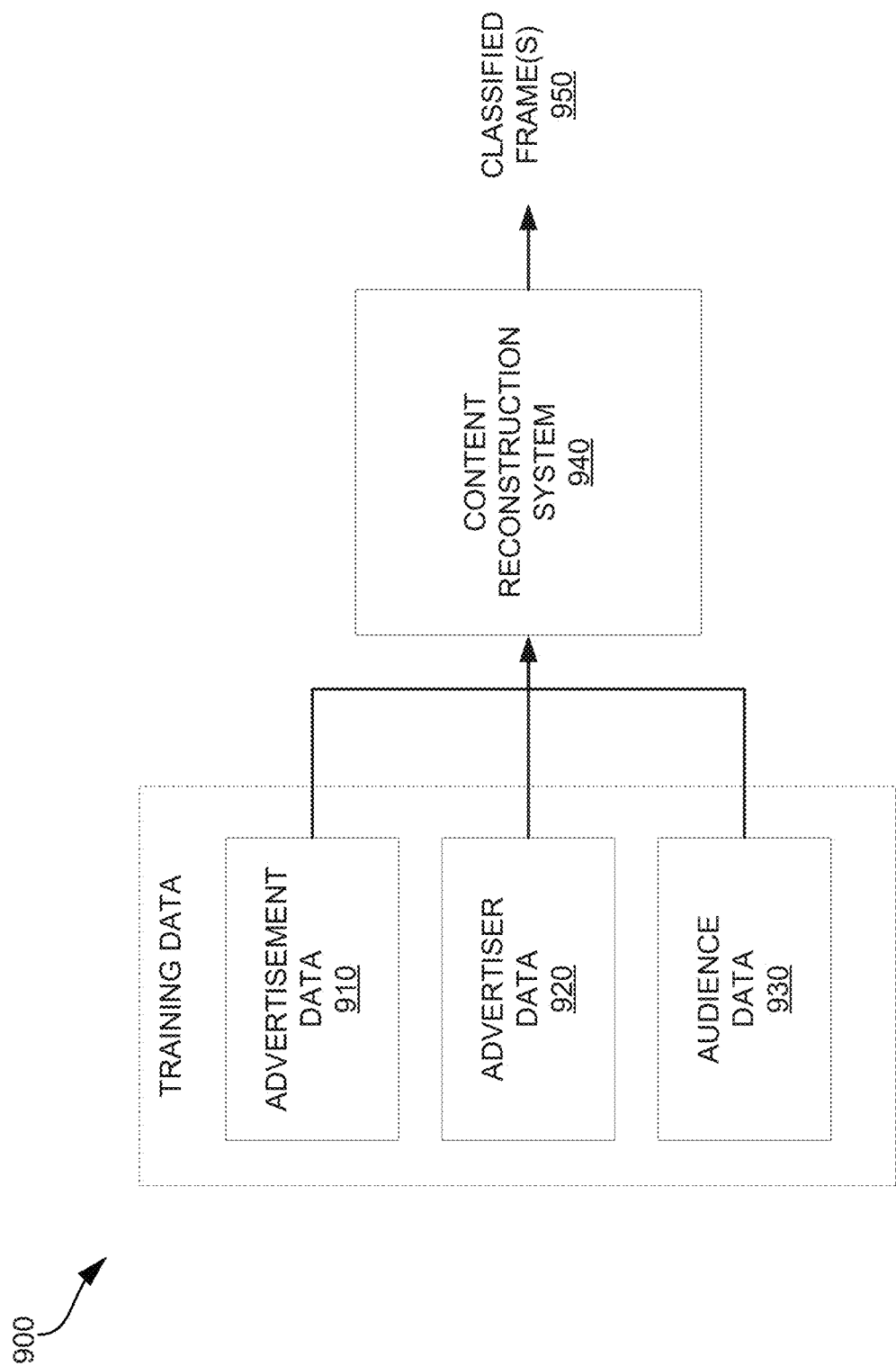
FIG. 9 illustrates an example system flow for training a content reconstruction system, according to some examples of the present disclosure.

FIG. 9 is a diagram illustrating an example system flow 900 for training a content reconstruction system 940 (similar to content reconstruction system 315 illustrated in FIG. 3), according to some examples of the present disclosure. In some examples, the system flow 900 can be used to train and update content reconstruction system 940 to classify a frame of media content (e.g., content 122, media content 310, media content 410, etc.) and output classified frames 950. By training the content reconstruction system 940, content reconstruction system 940 can learn to classify a frame of media content.

The content reconstruction system 940 can be trained with training data, which includes advertisement data 910, advertiser data 920, audience data 930, among others. The training data may include ground-truth relevance labels for each frame, or media content. For example, a machine learning algorithm may train using training data with ground truth labels indicating the true class/classification of each frame of media content.

As shown, the training data can include advertisement data 910, advertiser data 920, and audience data 930. The advertisement data 910 can include contextual information associated with media content (e.g., media content 310). The contextual information can include a type and/or genre of content, a type of product, service, a brand that media content is promoting, a type of scene, a background and/or setting, any activity and/or events, an actor(s), a mood and/or sentiment, a type of audio (e.g., dialogue, music, noise, certain sounds, etc.) or lack thereof, any objects (e.g., a product and/or brand, a device, a structure, a tool, a toy, a vehicle, etc.), environment/place/location of the scene, a landmark and/or architecture, a geographic location, a keyword, a message, a time and/or date, any other characteristics associated with media content 310, and/or any combination thereof.

The advertiser data 920 can include a business name, a brand name, a type of business or industry, a logo, contact information such as phone number, email address, business location, a style or image that the advertise is promoting, etc., advertisement history, marketplaces, and so on.

The audience data 930 can include information associated with audience or target audience who may be viewing target media content 350. For example, audience data 930 can include any information associated with audience and/or target audience such as demographics (e.g., age, sex, a geographic location, income, generation, occupation, etc.), user preferences (e.g., likes and/or dislikes), privacy settings, viewing history, search history, social media data, etc.

In some aspects, content reconstruction system 940 can be trained to output classified frames 950 where each frame of media content is classified into one of a high-relevance frame (e.g., a keyframe, a critical frame) or a low-relevance frame (e.g., an uncritical frame). In training, content reconstruction system 940 is trained to optimize the two variables, a high-relevance frame and a low-relevance frame (e.g., maximize the amount/number of high-relevance frames and minimize the amount/number of low-relevance frames).

Example Computer System

Figure 10:
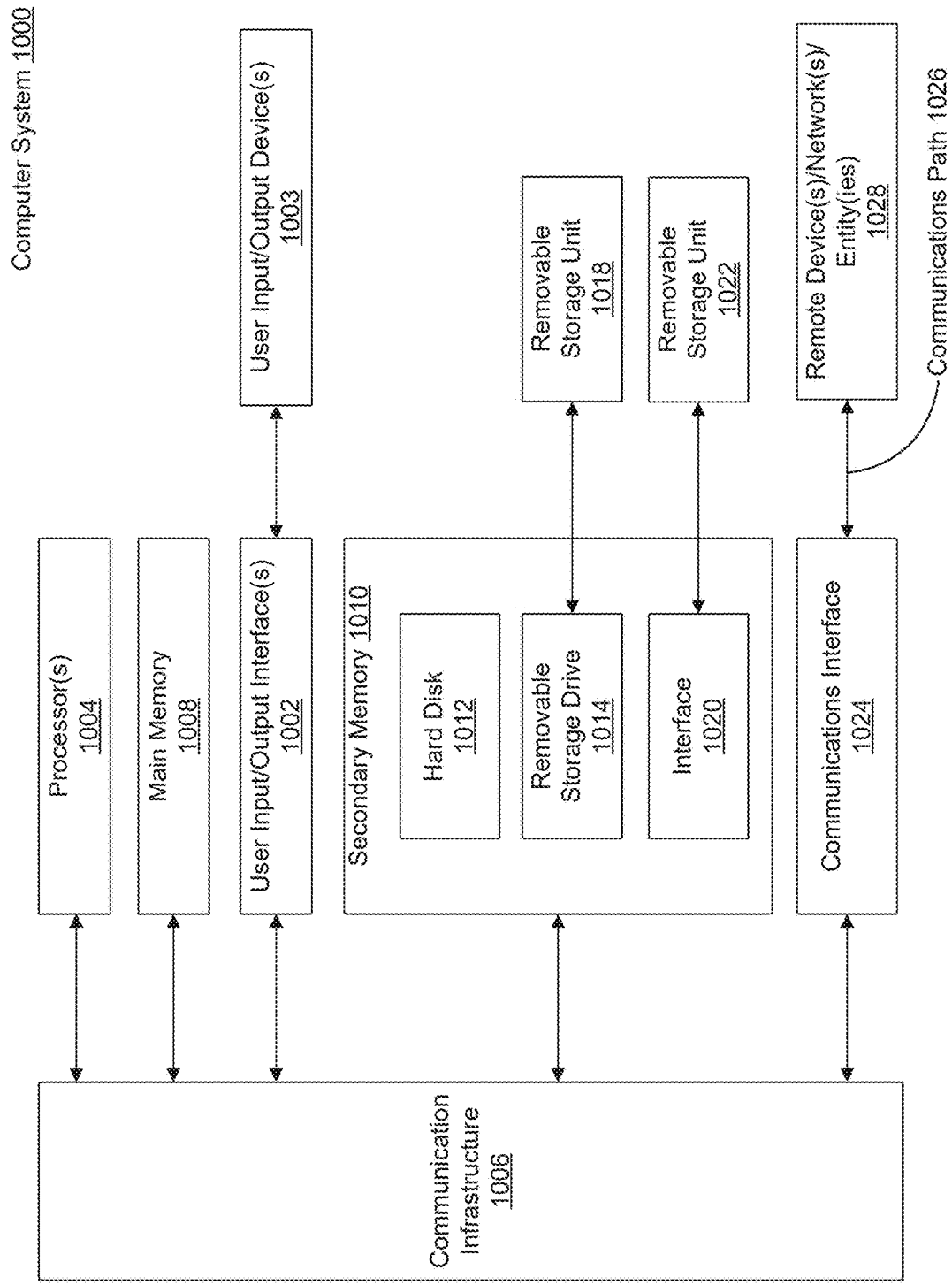
FIG. 10 illustrates an example computer system that can be used for implementing various aspects of the present disclosure.

Various aspects and examples may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the aspects and examples discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system xx00 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communications path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system, comprising:
   one or more memories; and
   at least one processor coupled to at least one of the one or more memories and configured to perform operations comprising:
      receiving media content of a first duration, the media content comprising a plurality of video frames;
      receiving one or more parameters associated with a target media content, wherein the one or more parameters include a parameter indicating a predetermined runtime duration;
      classifying each of the plurality of video frames of the media content based on a respective relevance level associated with each of the plurality of video frames with respect to the target media content, wherein each of the plurality of video frames are classified as a critical frame or an uncritical frame;
      selecting, from the plurality of video frames, a set of video frames classified as the critical frame to include in the target media content, wherein a runtime duration of the set of video frames meets the predetermined runtime duration;
      generating the target media content including the set of video frames of the plurality of video frames; and
      presenting the target media content via a display device.

2. The system of claim 1, wherein the respective relevance level is determined based on a presence or absence of text displayed on each of the plurality of video frames.

3. The system of claim 1, wherein the respective relevance level is determined based on a location of each frame within the media content.

4. The system of claim 1, wherein the respective relevance level is determined based on the one or more parameters associated with the target media content, which include at least one of a provider of the media content, one or more characteristics of the target media content, a geographic region for streaming the target media content, and target audience demographics.

5. The system of claim 1, wherein the at least one processor is configured to perform operations comprising:
   generating, using a generative machine learning (ML) model, a transcript of the media content based on audio signals of the media content; and
   regenerating audio signals corresponding to the predetermined runtime duration of the target media content based on the transcript and the predetermined runtime duration.

6. The system of claim 1, wherein the at least one processor is configured to perform operations comprising:
   generating a voiceover narrative for the target media content in a new language that is different from an original language associated with the media content.

7. The system of claim 1, wherein the at least one processor is configured to perform operations comprising:
   generating audio signals of the target media content based on a depicted text on one or more frames of the target media content.

8. The system of claim 1, wherein the respective relevance level includes a relevance score based on the one or more parameters associated with the target media content.

9. The system of claim 8, wherein generating the target media content of the predetermined runtime duration comprises:

selecting one or more video frames of the plurality of video frames based on a corresponding relevance score.

10. A computer-implemented method for processing media content, the computer-implemented method comprising:

receiving media content of a first duration, the media content comprising a plurality of video frames;

receiving one or more parameters associated with a target media content, wherein the one or more parameters include a parameter indicating a predetermined runtime duration;

classifying each of the plurality of video frames of the media content based on a respective relevance level associated with each of the plurality of video frames with respect to the target media content, wherein each of the plurality of video frames are classified as a critical frame or an uncritical frame;

selecting, from the plurality of video frames, a set of video frames classified as the critical frame to include in the target media content, wherein a runtime duration of the set of video frames meets the predetermined runtime duration;

generating the target media content including the set of video frames of the plurality of video frames; and presenting the target media content via a display device.

11. The computer-implemented method of claim 10, wherein the respective relevance level is determined based on a presence or absence of text displayed on each of the plurality of video frames.

12. The computer-implemented method of claim 10, wherein the respective relevance level is determined based on a location of each frame within the media content.

13. The computer-implemented method of claim 10, wherein the respective relevance level is determined based on the one or more parameters associated with the target media content, which include at least one of a provider of the media content, one or more characteristics of the target media content, a geographic region for streaming the target media content, and target audience demographics.

14. The computer-implemented method of claim 10, further comprising:

generating, using a generative machine learning (ML) model, a transcript of the media content based on audio signals of the media content; and regenerating audio signals corresponding to the predetermined runtime duration of the target media content based on the transcript and the predetermined runtime duration.

15. The computer-implemented method of claim 10, further comprising:

generating a voiceover narrative for the target media content in a new language that is different from an original language associated with the media content.

16. The computer-implemented method of claim 10, further comprising:

generating audio signals of the target media content based on a depicted text on one or more frames of the target media content.

17. The computer-implemented method of claim 10, wherein the respective relevance level includes a relevance score based on the one or more parameters associated with the target media content.

18. A non-transitory computer-readable medium having instructions stored thereon that, when executed by at least one computing device, cause the at least one computing device to perform operations comprising:

receiving media content of a first duration, the media content comprising a plurality of video frames;

receiving one or more parameters associated with a target media content, wherein the one or more parameters include a parameter indicating a predetermined runtime duration;

classifying each of the plurality of video frames of the media content based on a respective relevance level associated with each of the plurality of video frames with respect to the target media content, wherein each of the plurality of video frames are classified as a critical frame or an uncritical frame;

selecting, from the plurality of video frames, a set of video frames classified as the critical frame to include in the target media content, wherein a runtime duration of the set of video frames meets the predetermined runtime duration;

generating the target media content including the set of video frames of the plurality of video frames; and presenting the target media content via a display device.

* * * * *